(12) United States Patent
Hao et al.

(10) Patent No.: US 9,430,109 B2
(45) Date of Patent: Aug. 30, 2016

(54) TOUCH SCREEN PANEL AND METHOD FOR MANUFACTURING THE SAME, AND DISPLAY DEVICE

(71) Applicant: BOE TECHNOLOGY GROUP CO., LTD., Beijing (CN)

(72) Inventors: Guangye Hao, Beijing (CN); Yunsik Im, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 0 days.

(21) Appl. No.: 14/367,684

(22) PCT Filed: Dec. 17, 2013

(86) PCT No.: PCT/CN2013/089694
§ 371 (c)(1),
(2) Date: Jun. 20, 2014

(87) PCT Pub. No.: WO2015/027633
PCT Pub. Date: Mar. 5, 2015

(65) Prior Publication Data
US 2015/0062455 A1     Mar. 5, 2015

(30) Foreign Application Priority Data
Aug. 30, 2013   (CN) .......................... 2013 1 0390465

(51) Int. Cl.
*G06F 3/047* (2006.01)
*G06F 3/044* (2006.01)

(52) U.S. Cl.
CPC ..... *G06F 3/044* (2013.01); *G06F 2203/04103* (2013.01); *G06F 2203/04111* (2013.01); *Y10T 29/49155* (2015.01)

(58) Field of Classification Search
CPC ...... G06F 3/047; G06F 3/041; G06F 3/0412; G06F 3/044; G06F 3/045; G06F 2203/04103; G06F 2203/04111; H03K 17/9618; H01L 27/12; G02F 1/136; Y10T 29/49155
See application file for complete search history.

(56) References Cited

U.S. PATENT DOCUMENTS

2010/0066650 A1   3/2010  Lee et al.
2011/0069033 A1   3/2011  Meng et al.
(Continued)

FOREIGN PATENT DOCUMENTS

CN      101699377 A    4/2010
CN      101751181 A    6/2010
(Continued)

OTHER PUBLICATIONS

Office Action in Chinese Patent Application No. 201310390465.8, dated Oct. 8, 2015.
(Continued)

*Primary Examiner* — Lun-Yi Lao
*Assistant Examiner* — Johny Lau
(74) *Attorney, Agent, or Firm* — Baker Hostetler LLP

(57) ABSTRACT

The present invention discloses a touch Screen panel and a method for manufacturing the same, and a display device. The method comprises: forming a pattern of a touch electrode layer on a substrate; forming a pattern of an insulating layer on the touch electrode layer; and then forming the patterns of a bridging layer and a peripheral wiring on the insulating layer by one patterning process. In the invention, the patterning of the bridging layer and the peripheral wiring is accomplished simultaneously in one patterning process, thereby the number of patterning times during the manufacture process can be reduced, the manufacture efficiency of the touch screen panel can be improved, and the production cost can be lowered.

11 Claims, 5 Drawing Sheets

(56) References Cited

U.S. PATENT DOCUMENTS

| | | | |
|---|---|---|---|
| 2011/0205168 A1* | 8/2011 | Jun | G06F 3/044 345/173 |
| 2013/0057793 A1* | 3/2013 | Uchida | G02F 1/136213 349/42 |
| 2015/0009422 A1 | 1/2015 | Tung | |
| 2015/0027870 A1* | 1/2015 | Yang | G06F 3/041 200/5 R |
| 2015/0062454 A1 | 3/2015 | Hao et al. | |
| 2015/0103266 A1 | 4/2015 | Hao et al. | |

FOREIGN PATENT DOCUMENTS

| | | | |
|---|---|---|---|
| CN | 101751190 A | | 6/2010 |
| CN | 102023770 A | | 4/2011 |
| CN | 102446047 A | | 5/2012 |
| CN | 102681712 A | | 9/2012 |
| CN | 102693028 A | | 9/2012 |
| CN | 102799311 A | * 11/2012 | G06F 3/041 |
| CN | 202533920 U | | 11/2012 |
| CN | 103019496 A | | 4/2013 |
| CN | 203480463 U | | 3/2014 |
| EP | 2 500 803 A2 | | 9/2012 |

OTHER PUBLICATIONS

International Search Report and Written Opinion in PCT International Application No. PCT/CN2013/089694, dated Jun. 10, 2014.
Office Action in Chinese Patent Application No. 201310390550.4, dated Oct. 14, 2014.
Office Action in U.S. Appl. No. 14/361,515, dated Oct. 1, 2015.
International Search Report and Written Opinion in PCT International Application No. PCT/CN2013/089761, dated Jun. 23, 2014.
Office Action in Chinese Patent Application No. 201310390544.9, dated Oct. 22, 2015.
International Search Report and Written Opinion in PCT International Application No. PCT/CN2013/089755, dated Jun. 12, 2014.
Office Action in U.S. Appl. No. 14/361,580, dated Sep. 28, 2015.

* cited by examiner

TOUCH SCREEN PANEL AND METHOD FOR MANUFACTURING THE SAME, AND DISPLAY DEVICE

CROSS REFERENCE TO RELATED APPLICATION

This application is the U.S. national phase of PCT Application No. PCT/CN2013/089594 filed on Dec. 17, 2013, which claims priority to Chinese Patent Application No. 201310390465.8 filed on Aug. 30, 2013, the disclosures of which are incorporated in their entirety by reference herein.

FIELD OF THE INVENTION

The present invention relates to the field of touch technologies, and in particular, to a touch screen panel and a method for manufacturing the same, and a display device.

DESCRIPTION OF THE PRIOR ART

With the rapid development of display technologies, touch screen panel has been gradually popularized in people's life. At present, the touch screen panel may be divided according to its operating principle into resistive touch screen panel, capacitive touch screen panel, infrared touch screen panel, surface acoustic wave touch screen panel, electromagnetic touch screen panel, vibration wave sensitive touch screen panel and inhibited total internal reflection optical sensitive touch screen panel. Among them, capacitive touch screen panel is pursued as the new favorite of the industry due to its advantages of unique touch principle, high sensitivity, long life and high light transmittance, etc.

For a One Glass Solution (OGS) touch module that is widely used currently, a single-layer touch conductive film and a sensor are directly formed on a substrate. As shown in FIG. 1a and FIG. 1b, the specific structure of the OGS touch module includes a shielding layer (or blackmatrix, BM for short) 102, a bridging layer (Bridge) 103, an insulating layer (Overcoat, OC for short) 104, a touch electrode layer 105, a peripheral wiring 106 and a passivation layer 107 that are stacked in turn on a substrate 101; wherein the touch electrode layer 105 includes a touch sensing electrode 1051 and a touch driving electrode 1052 that are set crosswise and insulated from each other, the touch sensing electrode 1051 and the touch driving electrode 1052 have a rhombic pattern, adjacent touch driving electrodes 1052 that are disconnected from each other are bridged by the bridging layer 103, the touch sensing electrode 1051 and the touch driving electrode 1052 are coupled with the corresponding peripheral wiring 106 in a non-display region of the touch module, and the peripheral wiring 106 will transmit a signal on the touch electrode layer 105 to the corresponding IC chip for analyzing.

During the preparation of OGS touch module with the above structure, six masks are required for patterning: the first mask is used for forming the pattern of the shielding layer 102, the second mask is used for forming the pattern of the bridging layer 103, the third mask is used for forming the pattern of the insulating layer 104, the fourth mask is used for forming the pattern of the touch electrode layer 105, the fifth mask is used for forming the pattern of the peripheral wiring 106, and the sixth mask is used for forming the pattern of the passivation layer 107. In the above preparing process, the number of masks used is large, and each mask is required to be accurately aligned with the substrate when it is used, thus the production efficiency is lowered and the production cost is increased.

SUMMARY OF THE INVENTION

The embodiments of the invention provide a method for manufacturing a touch screen panel, which solves the problem of the prior art that the number of times the masks are used is large during the manufacturing of an OGS touch module and the production efficiency is low. Moreover, the embodiments of the invention further provide a touch screen panel with a novel structure that is prepared by the method according to the invention, and a display device containing the touch screen panel.

According to an embodiment of the invention, there provides a method for manufacturing a touch screen panel, comprising:

forming a pattern of a touch electrode layer on a substrate, wherein the touch electrode layer comprises a touch sensing electrode and a touch driving electrode that are formed crosswise and insulated from each other;

forming a pattern of an insulating layer on the touch electrode layer; and forming patterns of a bridging layer and a peripheral wiring on the insulating layer by one patterning process, wherein the bridging layer bridges the adjacent touch driving electrodes or the adjacent touch sensing electrodes.

According to an embodiment of the invention, there provides a touch screen panel, comprising: a substrate, and an insulating layer, a bridging layer and a peripheral wiring layer that are stacked in turn on the substrate; wherein:

the touch electrode layer, the insulating layer and the bridging layer are located in a touch region and a non-touch region of the touch screen panel, wherein the touch electrode layer comprises a touch sensing electrode and a touch driving electrode that are formed crosswise on the same layer and insulated from each other, and the bridging layer bridges the adjacent touch driving electrodes or the adjacent touch sensing electrodes; and the peripheral wiring is located in the non-touch region of the touch screen panel.

According to an embodiment of the invention, there provides a display device, which comprises the above touch screen panel according to the embodiments of the invention.

The above embodiments of the invention have the following beneficial effects:

The embodiments of the invention provide a touch screen panel and a method for manufacturing the same, and a display device. The method comprises: forming a pattern of a touch electrode layer on a substrate; forming a pattern of an insulating layer on the touch electrode layer; and then forming the patterns of a bridging layer and a peripheral wiring on the insulating layer by one patterning process. In the invention, the patterning of the bridging layer and the peripheral wiring is accomplished simultaneously in one patterning process, thus the number of patterning times during the manufacture process can be reduced, the manufacture efficiency of the touch screen panel can be improved, and the production cost can be lowered. Moreover, the embodiments of the invention further provide a touch screen panel with a novel structure that is prepared by the method according to the invention and a display device containing the touch screen panel.

BRIEF DESCRIPTION OF THE DRAWINGS

FIG. 1b is a schematic sectional view taken along direction A-A in FIG. 1a;

DETAILED DESCRIPTION OF THE PREFERRED EMBODIMENTS

Figure 1A:
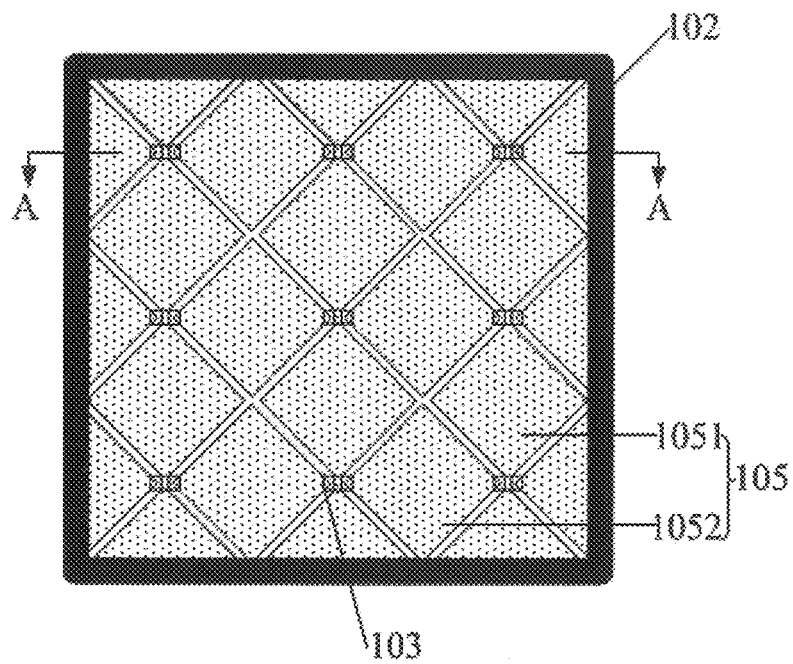
FIG. 1a is a schematic top view of an OGS touch module of the prior art.
Figure 1B:
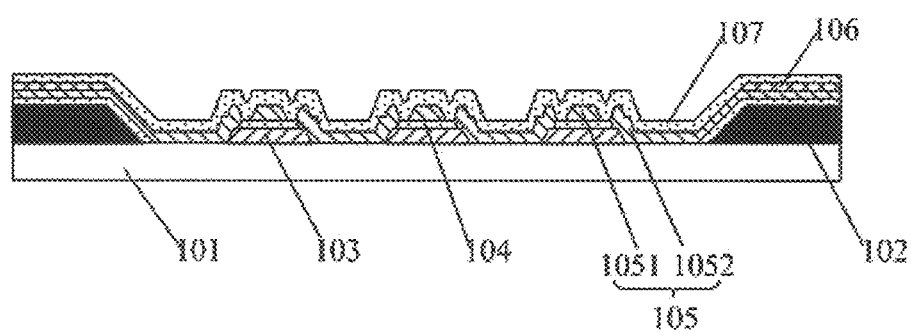

The specific embodiments of a touch screen panel and a method for manufacturing the same, and a display device according to the embodiments of the invention will be illustrated in detail below in conjunction with the drawings.

In the drawings, the thickness of each layer of thin film and the size and shape of each region do not reflect the real proportion; instead, they are only used for schematically illustrating the contents of the invention.

Figure 2:
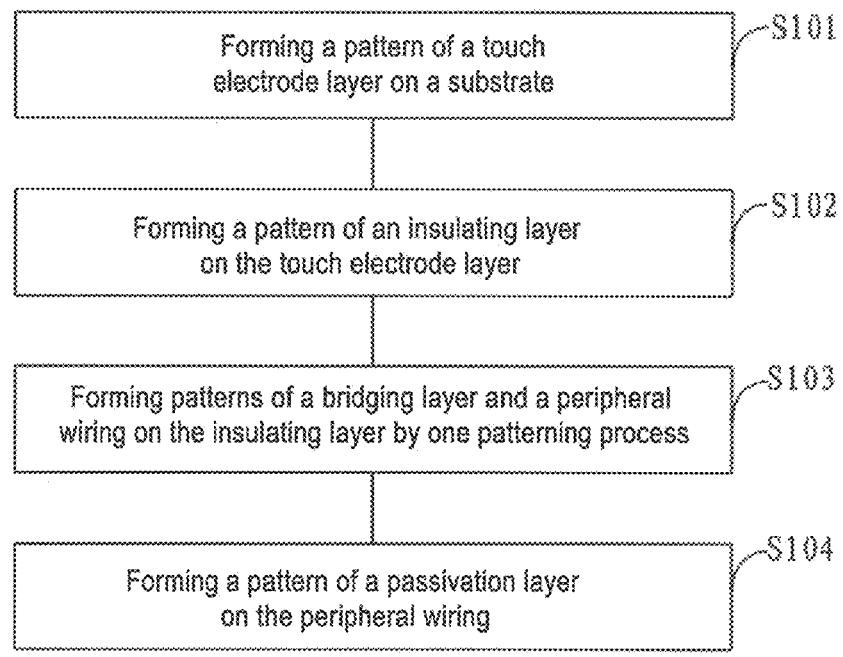
FIG. 2 is a flow chart of a method for manufacturing a touch screen panel according to one embodiment of the invention.
Figure 3A:
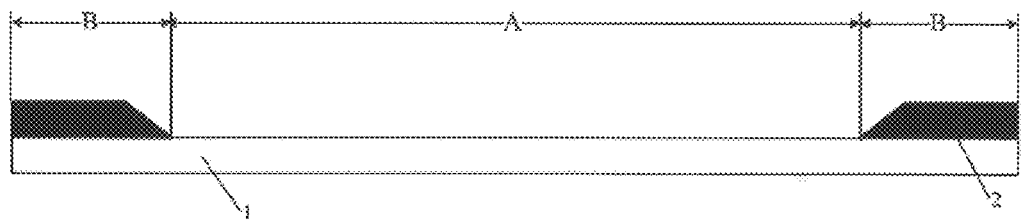
FIG. 3a is a schematic sectional view after a shielding layer is formed on a substrate according to one embodiment of the invention.
Figure 3B:
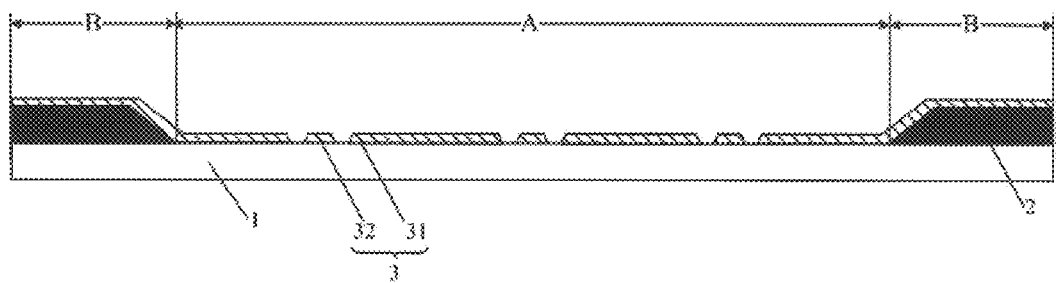
FIG. 3b is a schematic sectional view after a touch electrode layer is formed according to one embodiment of the invention.

According to one embodiment of the invention, there provides a method for manufacturing a touch screen panel, as shown in FIG. 2, which specifically includes the steps of:

Step S101: forming a pattern of a touch electrode layer 3 on a substrate 1, wherein the touch electrode layer 3 includes a touch sensing electrode 31 and a touch driving electrode 32 that are formed crosswise and insulated from each other, and as shown in FIG. 3b, the touch electrode layer 3 has a pattern in both a touch region A and a non-touch region B.

Figure 3C:
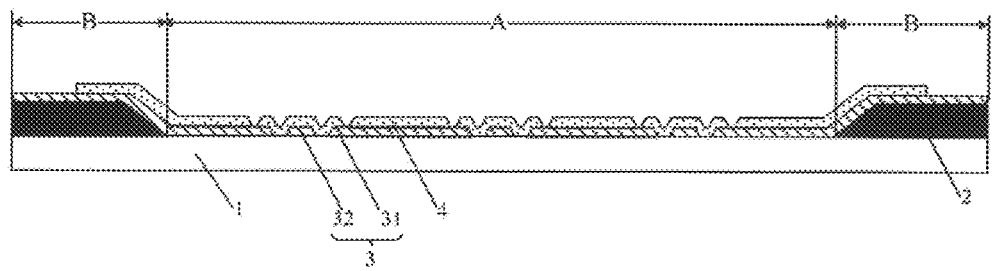
FIG. 3c is a schematic sectional view after an insulating layer is formed according to one embodiment of the invention.

Step S102: forming a pattern of an insulating layer 4 on the touch electrode layer 3, and as shown in FIG. 3c, the insulating layer 4 has a pattern in both a touch region A and a non-touch region B.

Preferably, before Step S102, the method may further include: forming a pattern of a shielding layer 2 on the substrate 1, and as shown in FIG. 3a, the shielding layer 2 only has a pattern in the non-touch region B. Specifically, the pattern of the shielding layer 2 may be first formed on the substrate 1, and then the pattern of the touch electrode layer 3 may be formed on the touch electrode layer 3. Alternatively, the pattern of the touch electrode layer 3 may be first formed on the substrate 1, and then the pattern of the shielding layer 2 may be formed on the touch electrode layer 3. Moreover, the patterns of the touch electrode layer 3 on the lower and the shielding layer 2 on the upper may also be formed simultaneously by one patterning process (in the specific masking process, a gray scale mask or a halftone mask may be employed), and it will not be described in detail here. Thus, the number of masks can be reduced, and the cost can be saved. Moreover, a photoresist such as a black photosensitive resin may also be directly used as the shielding layer 2, thus a process for independently manufacturing the shielding layer 2 can be omitted, and the production cost can be lowered.

Figure 3D:
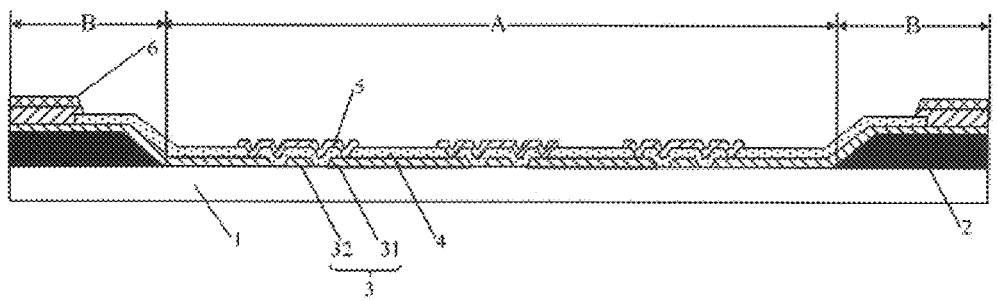
FIG. 3d is a schematic sectional view after a bridging layer and a peripheral wiring are formed by one patterning process according to one embodiment of the invention.

Step S103: forming the patterns of a bridging layer 5 and a peripheral wiring 6 on the insulating layer 4 by one patterning process, wherein as shown in FIG. 3d, the bridging layer 5 has a pattern in both a touch region A and a non-touch region B; the peripheral wiring 6 only has a pattern in the non-touch region B, which corresponds to the region with the pattern of the shielding layer 3, and the shielding layer 3 may shield the peripheral lead (i.e., the peripheral wiring 6) of the touch screen panel; and the bridging layer 5 bridges the adjacent touch driving electrodes 32 or the adjacent touch sensing electrodes 31. In FIG. 3d, it is illustrated by an example in which the bridging layer 3 bridges the adjacent touch sensing electrodes 31. Moreover, the peripheral wiring may be a metal wiring because metal has a small resistance and a better conduction effect, which is favourable for improving the touch sensitivity of the touch screen panel.

Moreover, in the above method according to the embodiment of the invention, as shown in FIG. 2, it may further include a Step S104 below.

Figure 3E:
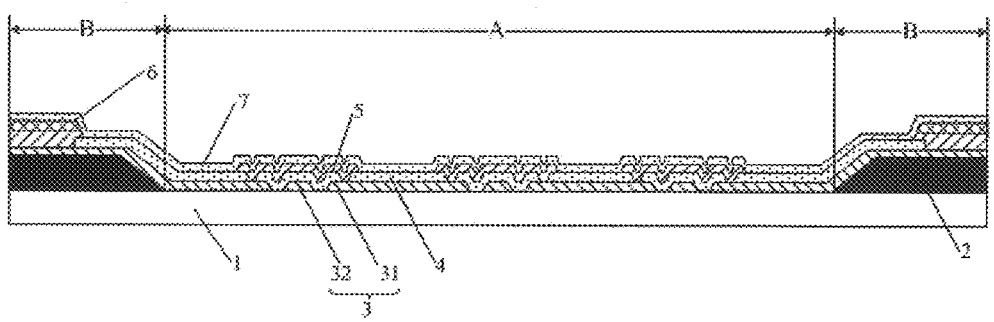
FIG. 3e is a schematic sectional view after a passivation layer is formed according to one embodiment of the invention.

Step S104: forming a pattern of a passivation layer 7 on the peripheral wiring 6, and as shown in FIG. 3e, the passivation layer 7 has a pattern in both a touch region A and a non-touch region B.

In the above method for manufacturing a touch screen panel according to the embodiment of the invention, the patterning of the bridging layer and the peripheral wiring is accomplished simultaneously in one patterning process, and in comparison with the prior art in which six patterning processes are required, the number of patterning times during the manufacture process can be reduced, the manufacture efficiency of the touch screen panel can be improved, and the production cost can be lowered.

For easy illustration, in the following description of the embodiments of the invention, the masks used in Steps S101-S104 will be described as the first mask, the second mask, the third mask, the fourth mask and the fifth mask.

The above Steps S101-S104 will be respectively illustrated in detail below.

Specifically, the forming a pattern of a shielding layer 2 on the substrate 1 is implemented in the following mode:

First of all, a thin film of a shielding layer 2 is formed on a substrate 1. During specific implementation, a photoresist material may be employed to prepare the shielding layer 2;

Then, the thin film of the shielding layer 2 is patterned through a first mask, as shown in FIG. 3a, to form the pattern of the shielding layer 2. It should be noted that the patterning process in all the embodiments of the invention at least includes: a photoresist coating process, an exposing and developing process and an etching process. The etching process in the embodiments of the invention may be a wet etching process or a dry etching process.

The Step S101, i.e., forming a pattern of a touch electrode layer 3 on a shielding layer 2, is implemented in the following mode:

First of all, a thin film of a touch electrode layer 3 is formed on a shielding layer 2;

Then, a photoresist is coated on the thin film of the touch electrode layer 3, and the photoresist is exposed through a second mask and developed; and Finally, the thin film of the touch electrode layer 3 is etched, the photoresist is peeled off, and the pattern of the touch electrode layer 3 is obtained. As shown in FIG. 3b, the touch electrode layer 3 includes a touch sensing electrode 31 and a touch driving electrode 32 that are formed crosswise and insulated from each other.

The Step S102, i.e., forming a pattern of an insulating layer 4 on the touch electrode layer 3 after Step S101, is implemented in the following mode:

First of all, a thin film of an insulating layer 4 is deposited on the touch electrode layer 3; and Then, the thin film of the insulating layer 4 is patterned through a third mask to form the pattern of the insulating layer 4, as shown in FIG. 3c.

Figure 4A:
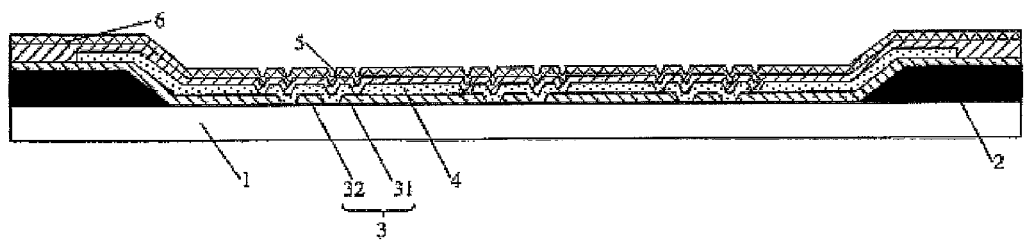
FIG. 4a-FIG. 4e are schematic sectional views showing each step of a process for forming a bridging layer and a peripheral wiring by one patterning process according to one embodiment of the invention.
Figure 4B:
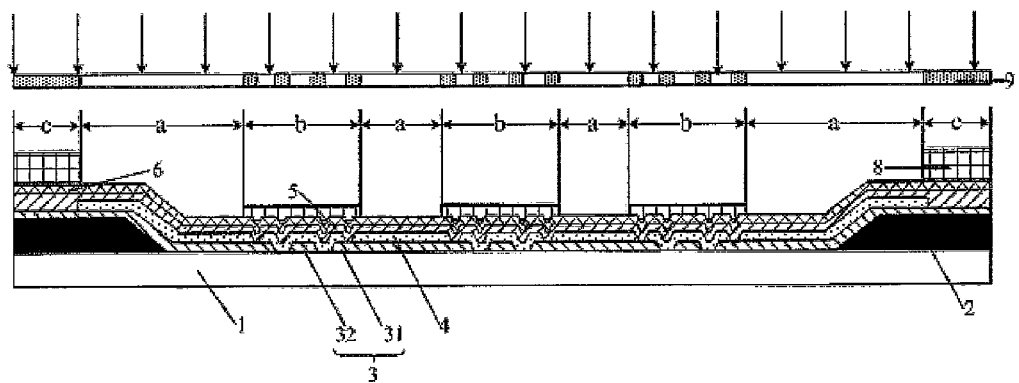

The Step S103, i.e., forming the patterns of a bridging layer 5 and a peripheral wiring 6 on the insulating layer 4 through one patterning process after Step S102, is implemented in the following mode:

First of all, a thin film of a bridging layer 5 and a thin film of a peripheral wiring 6 are formed in turn on the insulating layer 4, as shown in FIG. 4a;

Then, a photoresist 8 is formed on the thin film of the peripheral wiring 6, and the photoresist 8 is exposed through a fourth mask 9 and developed, and as shown in FIG. 4b, a photoresist completely-removed region a, a photoresist partially-reserved region b and a photoresist completely-reserved region c are obtained. During specific implementation, the fourth mask 9 may be a halftone mask or a graytone mask, and in FIG. 4b, a graytone mask is used. The photoresist partially-reserved region b corresponds to a pattern region that forms the bridging layer 5, and the photoresist completely-reserved region c corresponds to a pattern region that forms the peripheral wiring 6; and Finally, the photoresist completely-removed region a, the photoresist partially-reserved region b and the photoresist completely-reserved region c are etched respectively to form the patterns of the bridging layer 5 and the peripheral wiring 6.

Figure 4C:
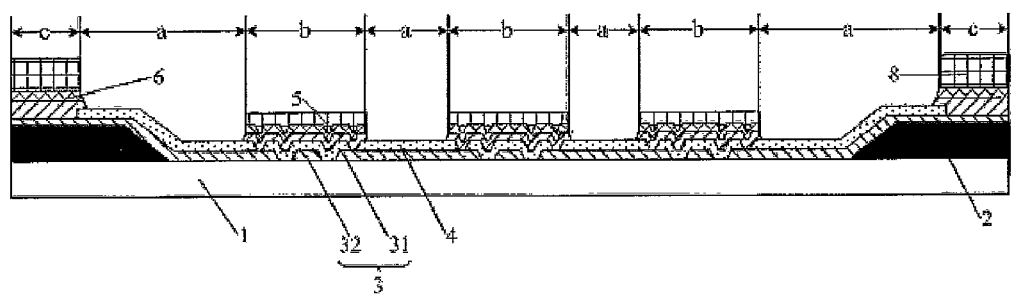
Figure 4D:
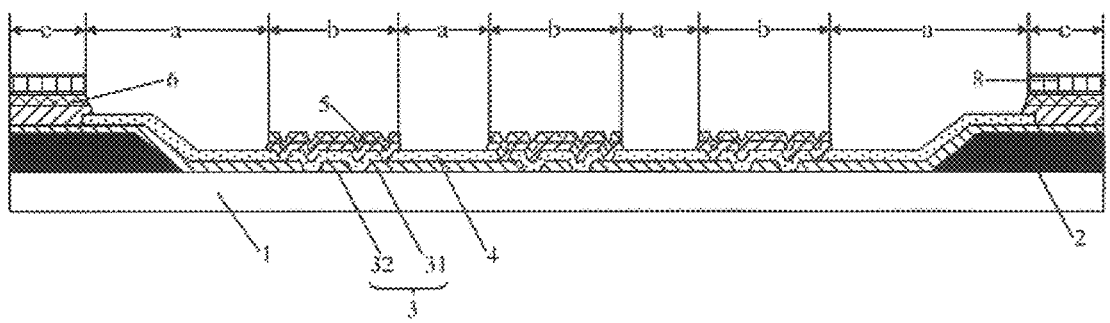
Figure 4E:
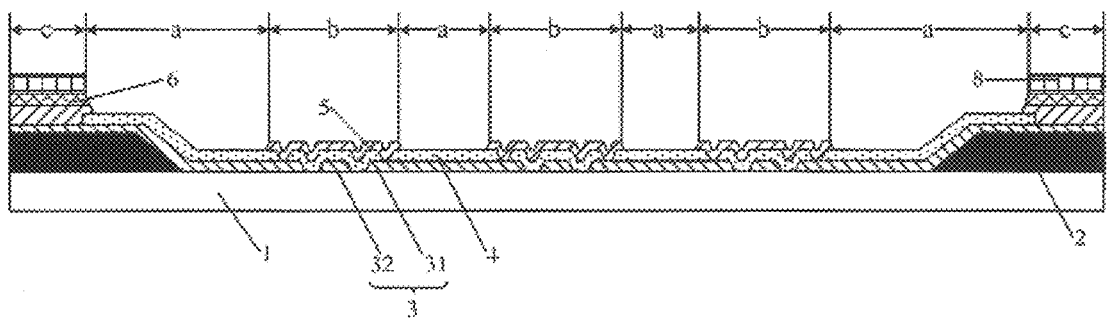

Moreover, the process in which the photoresist completely-removed region a, the photoresist partially-reserved region b and the photoresist completely-reserved region c are etched respectively to form the patterns of the bridging layer 5 and the peripheral wiring 6 is implemented in the following mode:

First of all, the thin film of the bridging layer 5 and the thin film of the peripheral wiring 6 in the photoresist completely-removed region a are removed by an etching process, and a pattern of the bridging layer 5 is obtained, as shown in FIG. 4c. The bridging layer 5 will bridge the adjacent touch sensing electrodes 3 that will be manufactured in a subsequent preparation process;

Then, the photoresist 8 in the photoresist partially-reserved region b is removed by an aching process, and the photoresist in the photoresist completely-reserved region c is thinned, as shown in FIG. 4d;

Then, the thin film of the peripheral wiring 6 in the photoresist partially-reserved region is removed by an etching process to expose the pattern of the bridging layer 5, as shown in FIG. 4e; and Finally, the photoresist 8 in the photoresist completely-reserved region c is peeled off, and the pattern of the peripheral wiring 6 is obtained, as shown in FIG. 3d.

Preferably, during specific implementation, the material of the bridging layer 5 is a transparent conductive material. For example, it may be tin indium oxide (ITO), zinc indium oxide (IZO), carbon nanotube or graphene. The advantage of employing ITO as the bridging layer 5 lies in that the transmittance of the touch screen panel can be improved, the light reflectivity of ITO is smaller relative to that of a metal, and the influence of the reflected light on human vision can be lowered.

However, the bridging layer 5 may also be prepared by a metal material, which is not limited here. Moreover, when the bridging layer 5 and the peripheral wiring 6 are both prepared by a metal material, the bridging layer 5 and the peripheral wiring 6 may be formed on the same layer and obtained by a one-time masking process.

The Step S104, i.e., forming a pattern of a passivation layer 7 on the peripheral wiring 6 after Step S103, is implemented in the following mode;

First of all, a thin film of a passivation layer 7 is deposited on the peripheral wiring 6; and Then, the thin film of the passivation layer 7 is patterned through a fifth mask to form a pattern of the passivation layer 7, as shown in FIG. 3e. The passivation layer 7 may protect the peripheral wiring 6 from being oxidized by the outside air.

Based on the same inventive conception, one embodiment of the invention further provides a touch screen panel prepared by the above method for manufacturing a touch screen panel. As shown in FIG. 3c, the touch screen panel specifically includes: a substrate 1; and a touch electrode layer 3, an insulating layer 4, a bridging layer 5 and a peripheral wiring 6 that are stacked in turn on the substrate 1; wherein:

the touch electrode layer 3, the insulating layer 4 and the bridging layer 5 are located in a touch region A and a non-touch region B of the touch screen panel, wherein the touch electrode layer 3 includes a touch sensing electrode 31 and a touch driving electrode 32 that are formed crosswise on the same layer and insulated from each other, and the bridging layer 5 bridges the adjacent touch driving electrodes 32 or the adjacent touch sensing electrodes 31. In FIG. 3e, it is illustrated by an example in which the bridging layer 5 bridges the adjacent touch sensing electrodes 31.

The peripheral wiring 6 is located in the non-touch region B of the touch screen panel. It may be seen from FIG. 3e that the peripheral wiring 6 is only formed in the non-touch region B of the touch screen panel.

Specifically, as shown in FIG. 3e, the above touch screen panel may further include: a shielding layer 2 which is located in the non-touch region B of the touch screen panel and between the touch electrode layer 3 and the substrate 1. Alternatively, the shielding layer 2 may be located in the non-touch region B of the touch screen panel and between the touch electrode layer 3 and the insulating layer 4.

Specifically, as shown in FIG. 3e, the above touch screen panel may further include: a passivation layer 7 which is located on the peripheral wiring 6 and covers the touch region A and the non-touch region B. Moreover, the peripheral wiring may be a metal wiring because a metal has a smaller resistance and a better conduction effect, which is favourable for improving the touch sensitivity of the touch screen panel.

Specifically, in this embodiment, the material of the shielding layer 2 in the touch screen panel may be a black photosensitive resin, thus the black photosensitive resin may be taken as the photoresist in a masking process simultaneously, and a process of independently coating a photoresist may be omitted, the consumption of the photoresist can be reduced, and the production cost c be saved.

Specifically, the material of the bridging layer 5 in the touch screen panel may be a transparent conductive material. For example, it may be tin indium oxide (ITO), zinc indium oxide (IZO), carbon nanotube or graphene; or the bridging layer may employ a metal. The advantage of employing ITO as the material of the bridging layer 5 lies in that the transmittance of the touch screen panel may be improved, and the light reflectivity of ITO is smaller relative to a metal, and the influence of the reflected light on human vision may be lowered. If the material of the bridging layer 5 is prepared by a metal, because metal has a resistance smaller than that of ITO, it is favorable for lowering the resistance of the touch electrode layer and improving the touch sensitivity. However, a metal is generally light-tight, thus the transmittance of the touch screen panel will be influenced. Therefore, the bridging layer 5 and the peripheral wiring 6 may be manufactured by one patterning process, that is, the patterns of the two films may be prepared through a graytone mask or a halftone mask. The specific preparation method is the same as that of the former embodiment and no further detailed description will be given here. Thus, in comparison with the six patterning processes employed in the prior art, the number of times the masks are used can be reduced, so that the manufacture efficiency of the touch screen panel can be improved, and the production cost can be lowered.

Specifically, the material of the touch electrode layer 3 in the touch screen panel may be a transparent conductive material. For example, it may be tin indium oxide (ITO) or zinc indium oxide (IZO), or it may be a transparent conductive material such as carbon nanotube and graphene, etc.

Based on the same inventive conception, one embodiment of the invention further provides a display device, which includes the above touch screen panel according to the embodiments of the invention. The display device may be any product or component that has a display function, for example, mobile phone, tablet computer, TV set, display, notebook computer, digital photo frame and navigator, etc. For the implementation of the display device, reference may be made to the embodiments of the above touch screen panel, and no further repeated description will be given here.

The embodiments of the invention provide a touch screen panel and a method for manufacturing the same, and a display device, wherein the manufacturing method includes: forming a pattern of a touch electrode layer on a substrate; forming as pattern of an insulating layer on the touch electrode layer; and then forming the patterns of a bridging layer and a peripheral wiring on the insulating layer by one patterning process. In the invention, the patterning of the bridging layer and the peripheral wiring is accomplished simultaneously in one patterning process, thus the number of patterning times during the manufacture process can be reduced, the manufacture efficiency of the touch screen panel can be improved, and the production cost can be lowered.

Apparently, various variations and modifications may be made on the invention by one skilled in the art without departing from the spirit and scope of the invention. Thus, if these modifications and variations belong to the scope of the claims of the invention and their equivalents, they are also intended to be contemplated by the invention.

What is claimed is:

1. A method for manufacturing a touch screen panel, comprising:
   forming a pattern of a touch electrode layer on a substrate, wherein the touch electrode layer comprises a touch sensing electrode and a touch driving electrode that are formed crosswise and insulated from each other;
   forming a pattern of an insulating layer on the touch electrode layer; and
   forming patterns of a bridging layer and a peripheral wiring on the insulating layer by one patterning process, wherein the bridging layer bridges the adjacent touch driving electrodes or the adjacent touch sensing electrodes;

wherein, before the step of forming a pattern of an insulating layer on the touch electrode layer, the method further comprises:
   forming simultaneously by one patterning process the pattern of the touch electrode layer and a pattern of the shielding layer between the touch electrode layer and the insulating layer;
   wherein, the step of forming patterns of a bridging layer and a peripheral wiring on the insulating layer by one patterning process comprises:
   forming a thin film of the bridging layer and a thin film of the peripheral wiring in turn on the insulating layer;
   forming a photoresist on the thin film of the peripheral wiring, exposing the photoresist through a mask and developing the photoresist, and obtaining a photoresist completely-removed region, a photoresist partially-reserved region and a photoresist completely-reserved region, wherein the photoresist partially-reserved region corresponds to a pattern region that forms the bridging layer, and the photoresist completely-reserved region corresponds to a pattern region that forms the peripheral wiring; and
   etching the photoresist completely-removed region, the photoresist partially-reserved region and the photoresist completely-reserved region respectively and forming the patterns of the bridging layer and the peripheral wiring.

2. The method according to claim 1, wherein, the mask is a halftone mask or a graytone mask.

3. The method according to claim 2, wherein, the step of etching the photoresist completely-removed region, the photoresist partially-reserved region and the photoresist completely-reserved region respectively and forming the patterns of the bridging layer and the peripheral wiring comprises:
   removing the thin film of the bridging layer and the thin film of the peripheral wiring in the photoresist completely-removed region by an etching process, and obtaining the pattern of the bridging layer;
   removing the photoresist in the photoresist partially-reserved region by an ashing process, and thinning the photoresist in the photoresist completely-reserved region; and
   removing the thin film of the peripheral wiring from the photoresist partially-reserved region by an etching process to expose the pattern of the bridging layer, peeling off the photoresist in the photoresist completely-reserved region, and obtaining the pattern of the peripheral wiring.

4. The method according to claim 1, wherein, the step of etching the photoresist completely-removed region, the photoresist partially-reserved region and the photoresist completely-reserved region respectively and forming the patterns of the bridging layer and the peripheral wiring comprises:
   removing the thin film of the bridging layer and the thin film of the peripheral wiring in the photoresist completely-removed region by an etching process, and obtaining the pattern of the bridging layer;
   removing the photoresist in the photoresist partially-reserved region by an ashing process, and thinning the photoresist in the photoresist completely-reserved region; and
   removing the thin film of the peripheral wiring from the photoresist partially-reserved region by an etching process to expose the pattern of the bridging layer, peeling off the photoresist in the photoresist completely-reserved region, and obtaining the pattern of the peripheral wiring.

5. The method according to claim 1, wherein, after forming the patterns of a bridging layer and a peripheral wiring on the insulating layer by one patterning process, the method further comprises:

forming a pattern of a passivation layer on the peripheral wiring.

6. A display device, comprising the touch screen panel according to claim 5.

7. A touch screen panel, comprising: a substrate; and a touch electrode layer, an insulating layer, a bridging layer and a peripheral wiring that are stacked in turn on the substrate; wherein:

the touch electrode layer, the insulating layer and the bridging layer are located in a touch region and a non-touch region of the touch screen panel, wherein the touch electrode layer comprises a touch sensing electrode and a touch driving electrode that are formed crosswise on the same layer and insulated from each other, and the bridging layer bridges the adjacent touch driving electrodes or the adjacent touch sensing electrodes; and the peripheral wiring is located in the non-touch region of the touch screen panel;

wherein the touch screen panel further comprises a shielding layer which is located in the non-touch region of the touch screen panel;

wherein the shielding layer is located between the substrate and the touch electrode layer or between the touch electrode layer and the insulating layer and wherein the pattern of the touch electrode layer and a pattern of the shielding layer is formed simultaneously by one patterning process;

wherein, the patterns of a bridging layer and a peripheral wiring on the insulating layer are formed by one patterning process comprises:

a thin film of the bridging layer and a thin film of the peripheral wiring are formed in turn on the insulating layer;

a photoresist formed on the thin film of the peripheral wiring, exposing the photoresist through a mask and developing the photoresist, and obtaining a photoresist completely-removed region, a photoresist partially-reserved region and a photoresist completely-reserved region, wherein the photoresist partially-reserved region corresponds to a pattern region that forms the bridging layer, and the photoresist completely-reserved region corresponds to a pattern region that forms the peripheral wiring; and the photoresist completely-removed region, the photoresist partially-reserved region and the photoresist completely-reserved region etched respectively and formed the patterns of the bridging layer and the peripheral wiring.

8. The touch screen panel according to claim 7, wherein, the touch screen panel further comprising a passivation layer which is located on the peripheral wiring and covers the touch region and the non-touch region.

9. The touch screen panel according to claim 7, wherein, the material of the shielding layer is a black photosensitive resin.

10. The touch screen panel according to claim 7, wherein, the material of the bridging layer and/or the touch electrode layer is a transparent conductive material.

11. The touch screen panel according to claim 10, wherein, the transparent conductive material is tin indium oxide (ITO), zinc indium oxide (IZO), carbon nanotube or graphene.

* * * * *